United States Patent [19]

Boone

[11] Patent Number: 4,715,997
[45] Date of Patent: Dec. 29, 1987

[54] CARBURETION SYSTEM AND METHOD FOR VAPORIZING FUEL AND FOR MIXING VAPORIZED HEATED FUEL WITH AIR TO POWER AN INTERNAL COMBUSTION ENGINE

[76] Inventor: Terry Boone, 164 N. Blackstone Ave., Fresno, Calif. 93701

[21] Appl. No.: 855,123

[22] Filed: Apr. 23, 1986

[51] Int. Cl.⁴ ............................................. F02M 15/04
[52] U.S. Cl. ..................................... 261/142; 123/549; 261/36.2; 261/72; 261/DIG. 83
[58] Field of Search ................. 261/DIG. 83, 142, 72, 261/36.2; 123/549

[56] References Cited

U.S. PATENT DOCUMENTS

| | | | |
|---|---|---|---|
| 1,173,378 | 2/1916 | Payton | 261/72 R |
| 1,253,484 | 1/1918 | Golden | |
| 1,637,104 | 7/1927 | Crone | 261/142 |
| 1,851,416 | 3/1932 | Bauer | |
| 1,938,497 | 12/1933 | Pogue | 261/DIG. 83 |
| 2,229,452 | 1/1941 | Hammer et al. | 261/DIG. 83 |
| 2,658,489 | 11/1953 | Putt | 261/DIG. 83 |
| 3,086,580 | 4/1963 | Capehart | 261/36 A |
| 3,336,734 | 8/1967 | Schultz | 261/36 A |
| 3,498,279 | 3/1970 | Seeley, Jr. | |
| 3,667,436 | 6/1972 | Reichhelm | |
| 3,868,939 | 3/1975 | Friese et al. | |
| 4,020,815 | 5/1977 | Hubert | |
| 4,050,425 | 12/1977 | Holleboom | |
| 4,108,953 | 8/1978 | Rocco | 261/142 |
| 4,151,821 | 5/1979 | Wichman et al. | 261/DIG. 83 |
| 4,177,779 | 12/1979 | Ogle | 261/DIG. 83 |
| 4,267,802 | 5/1981 | Garretson | 261/DIG. 83 |
| 4,270,506 | 6/1981 | Lowe | 261/DIG. 83 |
| 4,372,280 | 2/1983 | Adams | 261/DIG. 83 |
| 4,398,523 | 8/1983 | Henson | 261/DIG. 83 |
| 4,550,706 | 11/1985 | Hoffman | 261/DIG. 83 |

OTHER PUBLICATIONS

Alan Wallace, The 200 MPG Carburetor ©1980, Premier Publishers, Fort Worth, Tex.

Primary Examiner—Tim Miles
Attorney, Agent, or Firm—Kendrick, Netter & Bennett

[57] ABSTRACT

A carburetion system for internal combustion engines includes means for heating and vaporizing fuel in a chamber to a very high temperature and for delivering the heated, vaporized fuel to a holding chamber for the fuel. From the holding chamber, the system draws the heated, vaporized fuel, by vacuum, into admixture with outside air in precise, predetermined ratios for delivery to the conventional carburetion system of an internal combustion engine.

5 Claims, 8 Drawing Figures

CARBURETION SYSTEM AND METHOD FOR VAPORIZING FUEL AND FOR MIXING VAPORIZED HEATED FUEL WITH AIR TO POWER AN INTERNAL COMBUSTION ENGINE

This invention relates to carburetion systems that include means for vaporizing and heating a wide variety of fuels, mixing the fuels with air in precise, predetermined amounts, and delivering the heated, vaporized fuel/air mixtures to internal combustion engines. The invention also relates to methods for vaporizing and heating fuel and for mixing the heated, vaporized fuel in precise, predetermined amounts with atmospheric air, and for delivering the fuel/air mixture to internal combustion engines.

The carburetion systems of this invention comprise means for heating and vaporizing fuels for internal combustion engines including a chamber having fuel inlet means, means for atomizing the fuels (if the fuels are liquid), means for vaporizing the fuels, as necessary, and for heating the fuels to very high temperatures; adjustable means for admitting air to the fuel heating chamber and for driving or propelling the vaporized, heated fuels toward and into means for holding the heated vaporized fuels adjacent the inlet to means for drawing the heated vaporized fuel into admixture with air. This system also includes adjustable means for controlling the flow of heated, vaporized fuels from the fuel heating and vaporizing chamber into means for holding heated, vaporized fuel adjacent the inlet to means for drawing heated, vaporized fuel into admixture with outside or atmospheric air, and means for holding the heated, vaporized fuel driven from the fuel heating and vaporizing chamber adjacent to the inlet means for means for drawing heated, vaporized fuel into admixture with air.

The system also includes means for drawing heated, vaporized fuel from the holding means, and for drawing air from outside the system into means for mixing the heated, vaporized fuel with the outside air including vacuum-controlled, adjustable valve means in the exit means from the vaporized fuel-holding means, and vacuum chamber means having, as its inlet means, the outlet from the holding means. The vacuum chamber means has, as its exit means, means for passing heated, vaporized fuel from the vacuum chamber into an air/fuel mixing zone. The vacuum chamber means also comprises diaphragm means joined to means for controlling the flow of outside air into the air/fuel mixing zone.

In preferred embodiments, the system also includes means for feeding fuel to the fuel heating and vaporizing chamber from a fuel supply system, and means for returning unvaporized, unheated fuel to the fuel supply means comprising fuel chamber means having air inlet means, means for forming a partial vacuum inside the fuel chamber means, fuel inlet means, fuel outlet means, and fuel line means for passing fuel from the fuel heating and vaporizing means of the fuel chamber means through the fuel inlet means and fuel line means for passing fuel from the fuel chamber means to the fuel supply system.

The carburetion system of this invention also includes means for housing the system, and means for attaching the system housing to the inlet means for the carburetion system on an internal combustion engine.

The chamber for heating and vaporizing the fuel includes, in preferred embodiments, inlet means for fuel joined to atomizer means for atomizing liquid fuels, and for directing atomized, liquid fuel against means for heating the fuel comprising an electrically heated, preferably metal surface having a plurality of projections directed toward the outlet of the fuel atomizing means. These projections deflect atomized, partially vaporized fuel toward a plurality of heated, preferably metal surfaces having a plurality of heating fins projecting from their external surfaces. Preferably, the fuel-heating means are heated by means of electrical radiation means internal to these heating means. In preferred embodiments, the source of the electrical heating energy can be a battery linked to the internal combustion engine of a car or truck.

The power valves that control the flow of heated, vaporized fuel from the heating and vaporizing chamber into the means for holding heated, vaporized fuel adjacent the inlet to means for drawing heated, vaporized fuel into admixture with outside air comprise a plurality, preferably two, of adjustable butterfly valves placed in the opening of a passageway leading from the outlet of the heating and vaporizing chamber into the holding chamber adjacent the inlet to the means for drawing air and heated, vaporized fuel into admixture with one another. These power valves can be adjusted, in preferred embodiments, so that sufficient fuel is furnished to the internal combustion engine to sustain the engine at the highest desired rpm level.

The heating and vaporizing chamber includes an air inlet means for admitting air to the heating and vaporizing chamber and for driving or propelling the heated, vaporized fuel from the heating and vaporizing chamber into the holding chamber for the fuel. In preferred embodiments, this air inlet means is positioned atop the fuel-heating and vaporizing chamber, and as far as possible from the outlet leading from the outlet leading from the heating and vaporizing chamber.

The means for drawing heated, vaporized fuel from the holding chamber and for drawing air from outside the system into means for mixing the heated, vaporized fuel with the outside air includes vacuum-controlled, adjustable valve means positioned in the exit means from the holding chamber for heated, vaporized fuel. The outlet from the holding chamber, in preferred embodiments, also forms the inlet means for the vacuum chamber means of the system. The vacuum-controlled, adjustable valve means in this outlet from the fuel-holding chamber and inlet to the vacuum chamber, in preferred embodiments, comprises a frustoconical member having a size and shape appropriate to the fuel requirement range of the internal combustion engine for which the system is intended. The size and shape of the frustoconical member are also dictated by the required, desired or tolerable levels of carbon monoxide and unconsumed hydrocarbons in the exhaust of the internal combustion engine for which the system is intended.

In preferred embodiments, the vacuum-controlled, adjustable valve means for controlling the flow of heated, vaporized fuel from the holding chamber into the vacuum chamber is linked, on one side, to spring means, and, on the other side, to a shaft for adjusting the positioning of the valve in the fuel holding chamber outlet/vacuum chamber inlet. In this way, the system delivers sufficient fuel to sustain the running of the internal combustion engine to which the system is attached when the system is idling at a desired rpm level.

In preferred embodiments, the vacuum chamber means includes, as its inlet, the outlet for the fuel-holding chamber. The vacuum chamber comprises diaphragm means joined to openable, closable sealing means at the inlet for outside air to the chamber for mixing heated, vaporized fuel with the outside air. The diaphragm means is also joined to means for moving the vacuum-controlled, adjustable valve means into and out of the fuel inlet to the vacuum chamber.

When the diaphragm means in the vacuum chamber means moves against the spring means in response to demand for additional air/fuel mixture from the engine to which the system is linked, the sealing means at the air inlet to the mixing chamber for fuel and outside air opens, admitting air to the mixing chamber from outside the system, preferably through air filter means. Simultaneously, movement of the diaphragm means admits heated, vaporized fuel from the holding chamber into the same mixing chamber. In the mixing chamber, outside air mixes with heated, vaporized fuel in a predetermined ratio determined by the size and shape of the vacuum-controlled, adjustable valve means in the fuel inlet to the vacuum chamber and by the positioning of the power valves in the passageway between the chamber for heating and vaporizing fuel and the chamber for holding the heated, vaporized fuel adjacent the inlet to the vacuum chamber.

The sealing means at the air inlet to the mixing chamber for fuel and outside air also opens when the internal combustion engine to which the system of this invention is linked backfires. After relief of the positive pressure created by the backfire, the system of this invention automatically resets itself for normal operation.

The invention can better be understood by reference to the drawings in which.

The carburetion method of this invention comprises heating and vaporizing fuel for an internal combustion engine to a temperature sufficient to permit the fuel to drive an internal combustion engine with a relatively low emission of carbon monoxide and unconsumed hydrocarbons from the internal combustion engine; propelling the heated, vaporized fuel into a holding zone for the heated, vaporized fuel; drawing the heated, vaporized fuel in precise, predetermined amounts by vacuum into a zone for mixing the heated, vaporized fuel with atmospheric air; drawing outside air into the mixing zone by vacuum; mixing the outside air with heated, vaporized fuel in the mixing zone; and delivering the mixture of heated, vaporized fuel and air to an internal combustion engine.

Figure 3:
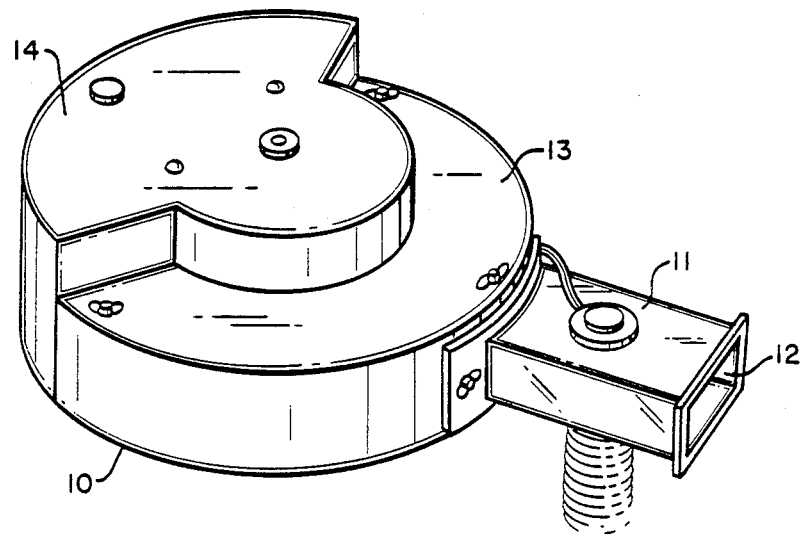
FIG. 3 is a perspective view of the preferred embodiment of the carburetion system shown in FIG. 1.

FIG. 3 shows a housing, generally designated 10, for a preferred embodiment of the carburetion system of this invention. Housing 10 has an inlet pipe 11 with an opening 12 for admitting outside or atmospheric air to this system. Cover member 14 overlies the holding chamber for heated, vaporized fuel, the vacuum chamber below the holding chamber, and the vacuum-controlled, adjustable valve that regulates the flow of heated, vaporized fuel from the holding chamber, through the vacuum chamber, and into a chamber for mixing the heated, vaporized fuel with outside air. Housing 10 also includes cover member 14 for the chamber for heating and vaporizing fuel, utilizing radiant heat from electrically-heated metal elements inside the heating and vaporizing chamber.

Figure 2:
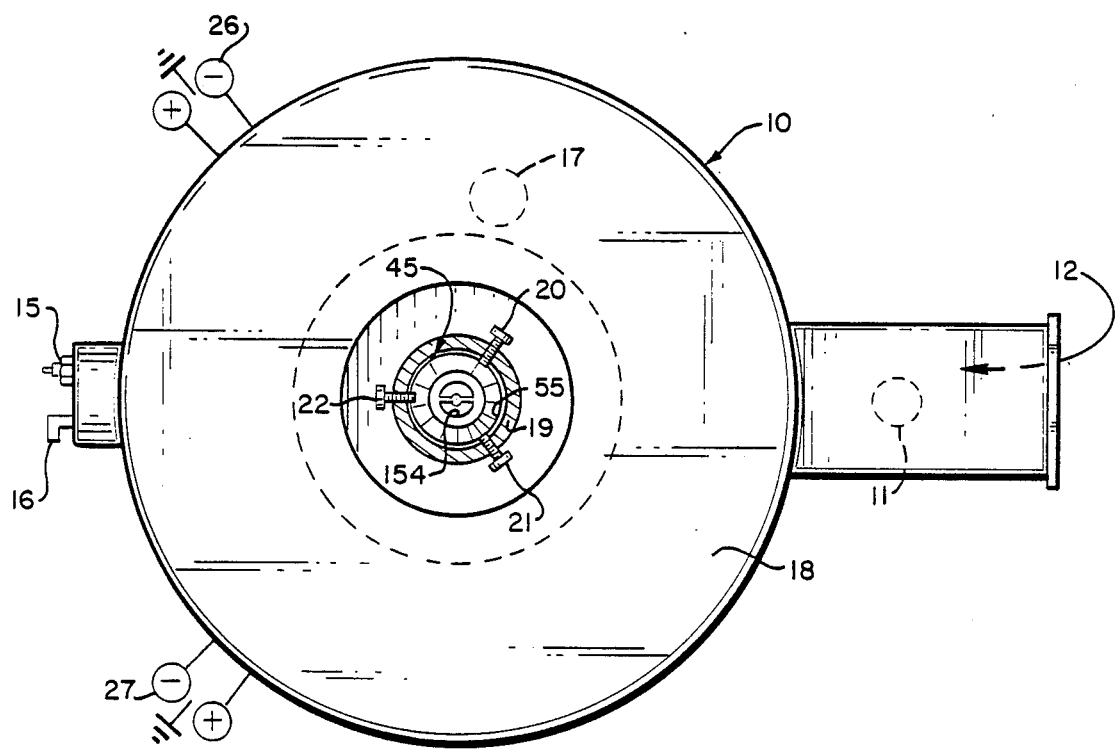
FIG. 2 is a bottom plan view of a housing for the preferred embodiment of the carburetion system shown in FIG. 1.

FIG. 2 shows a bottom plan view of this same housing 10 and air intake pipe 11. On the left of the housing are fuel inlet 15 and fuel outlet 16, leading into and out of the fuel heating and vaporizing chamber of the system. Thermostat and air control 17 are positioned on the bottom wall of housing 10. In the center of the bottom wall 18 of housing 10 is adaptor 19 equipped with set screws 20, 21 and 22. Adaptor 19 has a size and shape appropriate to join the system to the air intake of a conventional carburetor of an internal combustion engine. Heated, vaporized fuel passes through passageway 101 inside cone-shaped member 55 which, in turn, lies within adaptor 19. The vaporized fuel mixes with air flowing through passageway 100 inside adaptor 19. As better seen in FIG. 4, the fuel and air mix in mixing chamber 46 before passing into the carburetor to which the system is attached.

Figure 1:
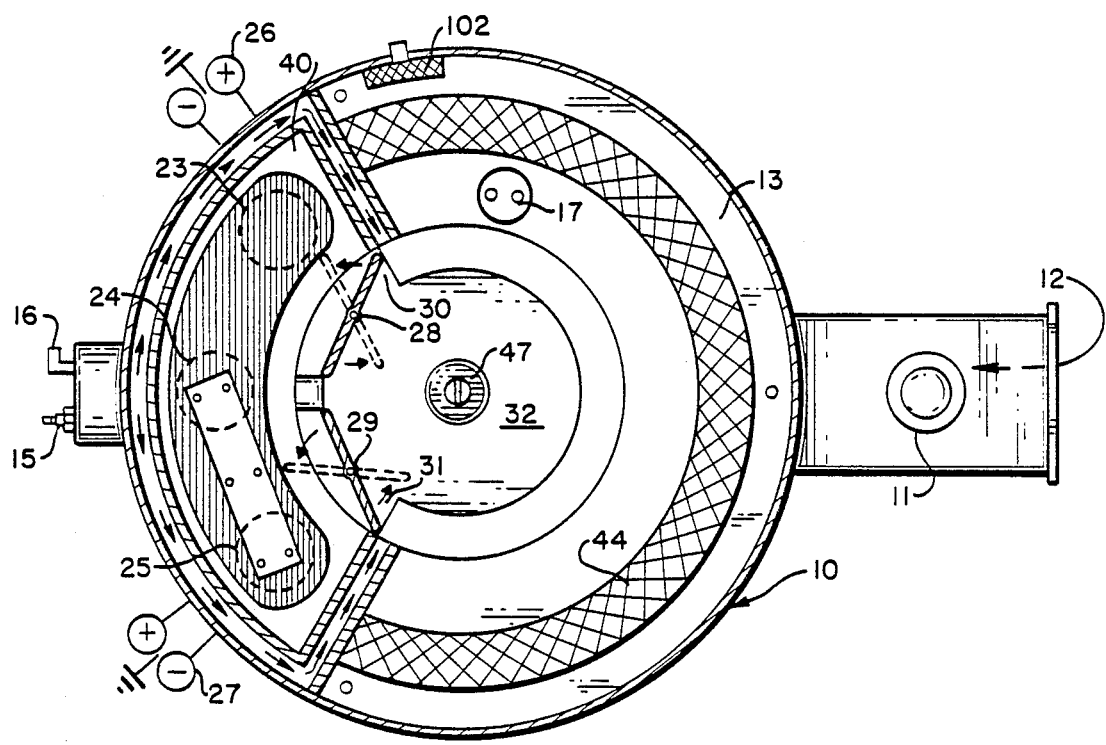
FIG. 1 is a top plan view of a preferred embodiment of the carburetion system of the invention with a portion of the cover of the fuel heating and vaporizing chamber broken away to show the internal structure of the chamber.
Figure 4:
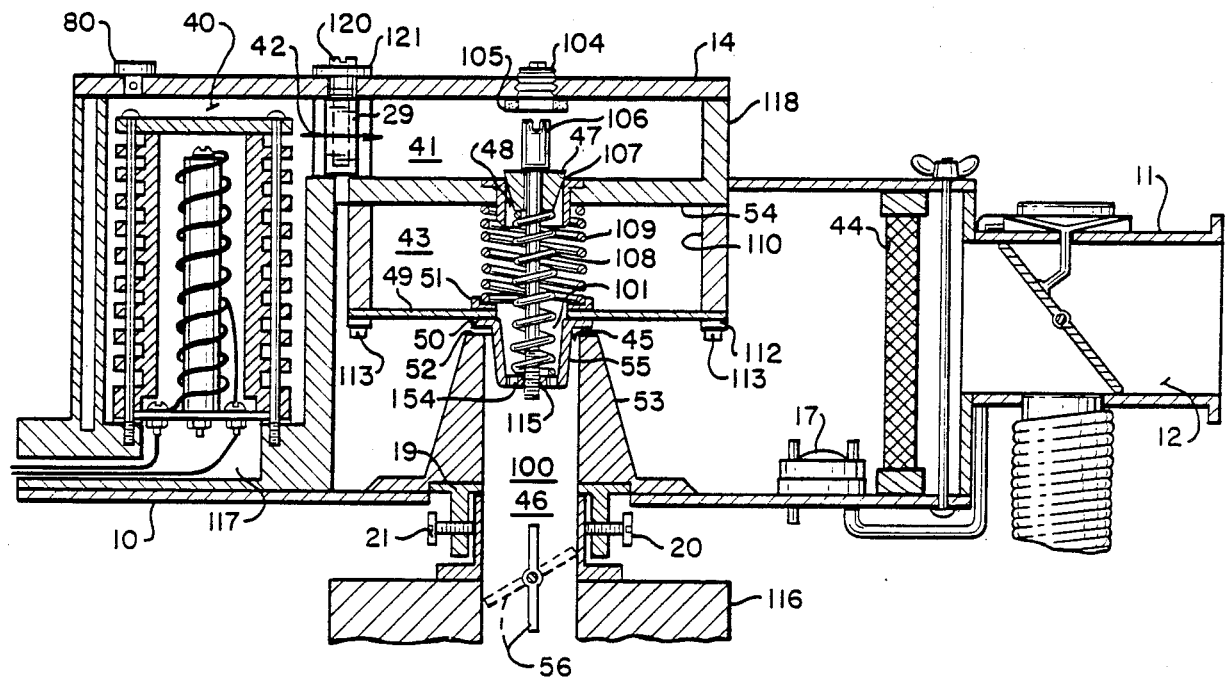
FIG. 4 is a side elevation view, in cross-section, of the carburetion system shown in FIG. 1.

FIG. 1 shows a top plan view of the system with cover 14 partially removed to expose the top surface of heating elements 23, 24 and 25. These radiant heaters 23, 24 and 25 are powered by electricity delivered on circuit lines 26 and 27, preferably from a conventional 6-volt or 12-volt battery as found on many internal combustion engines. Adjustable butterfly power valves 28 and 29 lie in passageways 30 and 31 from the chamber for heating and vaporizing fuel to chamber 32. FIG. 4 shows slotted bolt 120, linked to valve 29 through lid 14. Turning bolt 120 moves valve 28 in passageway 31. A lock nut 121, linked to valve 28, permits movement of valve 28 in the same way. Chamber 32 holds heated, vaporized fuel adjacent the inlet to a vacuum chamber for drawing outside air and heated, vaporized fuel into admixture with one another for delivery to an internal combustion engine. Closed emission filter 102 traps particulates in air recycled from the engine to which the system is attached.

Figure 8:
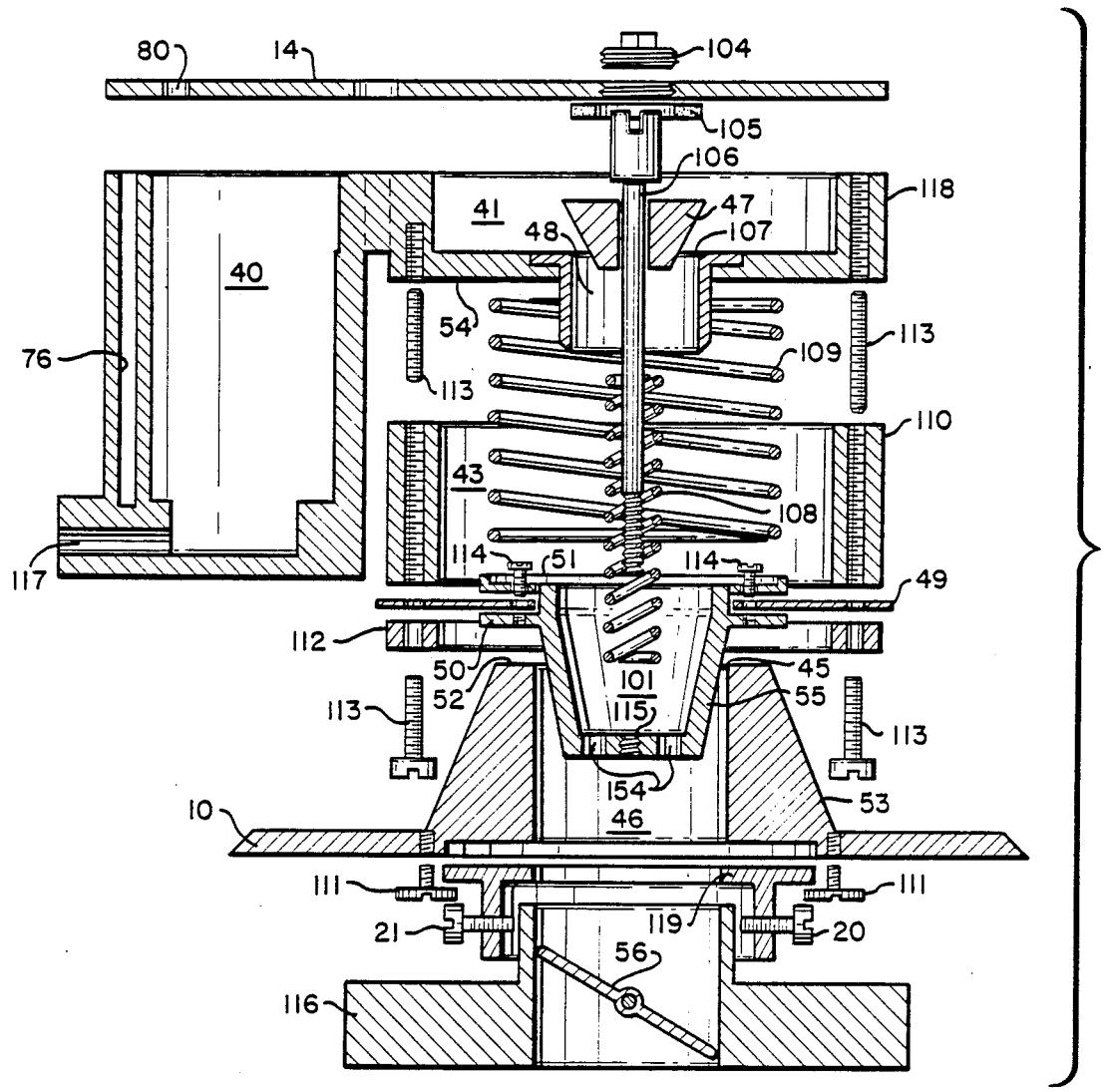
FIG. 8 is an exploded side elevation view of a portion of the carburetion system shown in FIG. 4.

FIGS. 4 and 8 show the entire carburetion system of this invention, linked to carburetor 116 of a conventional internal combustion engine by means of bolts 20, 21 and screws 111. The system includes fuel heating and vaporizing chamber 40; fuel-holding chamber 41; passageway 42 leading from the exit of heating chamber 40 to fuel-holding chamber 41; vacuum chamber 43 for drawing heated, vaporized fuel from holding chamber 41 into admixture with outside air entering the system through inlet pipe 11, air filter 44 and air intake 45; and chamber 46 for mixing outside air with heated, vaporized fuel from chamber 41. FIG. 4 also shows vacuum-controlled, adjustable vapor control valve 47 (see also FIG. 1 for a plan view of valve 47) mounted in 107 outlet 48 from fuel-holding chamber 41 inside heated fuel chamber housing 118. Vapor control valve 47 is mounted between idle adjustment plug 104, idle adjustment seal 105, and idle adjustment screw 106 on one side, and vapor valve spring 108 and threaded opening 115, which receives idle adjustment screw 106, on the other side. Adjustment of screw 106 also adjusts the tension on spring 108 and, in turn, the positioning of valve 47 in seat 107. Adjustment of screw 106 permits adjustment of the flow of heated, vaporized fuel from vapor chamber 41 through passageway 48 and vapor passage 154 to mixing chamber 46. Outlet 48 from fuel-holding chamber 41 is also the inlet to vacuum chamber 43.

Diaphragm 49, affixed to walls 110 of vacuum chamber 43 by means of bolts 113 and the securement members 112, is joined to circumferential seal 50 on one side and to circumferential plate 51 by bolts 114 on the side of diaphragm 49 that is within vacuum chamber 43. Sealing member 50 is, as shown in FIG. 4, seated in sealing engagement upon circumferential surface 52 atop hollow conical member 53. When diaphragm 49 moves upwardly against the resistance of diaphragm spring 109 in response to vacuum demand from the internal combustion engine to which the system is joined, sealing member 50 moves away from surface 52, permitting air to pass through the gap created, and into air/fuel mixing chamber 46. Simultaneously, movement of diaphragm 49 toward wall member 54 also moves vapor control valve 47 upwardly, and out of sealing engagement with opening 48. The movement of vapor control valve 47 out of opening 48 permits heated, vaporized fuel from holding chamber 41 to flow downwardly through vacuum chamber 43, vapor passage 154, and cone-shaped member 55 into air/fuel mixing chamber 46.

Stock choke 56, which forms part of the standard carburetor of an internal combustion engine, performs the conventional function of thermal choking for starting the engine when cold.

Figure 6:
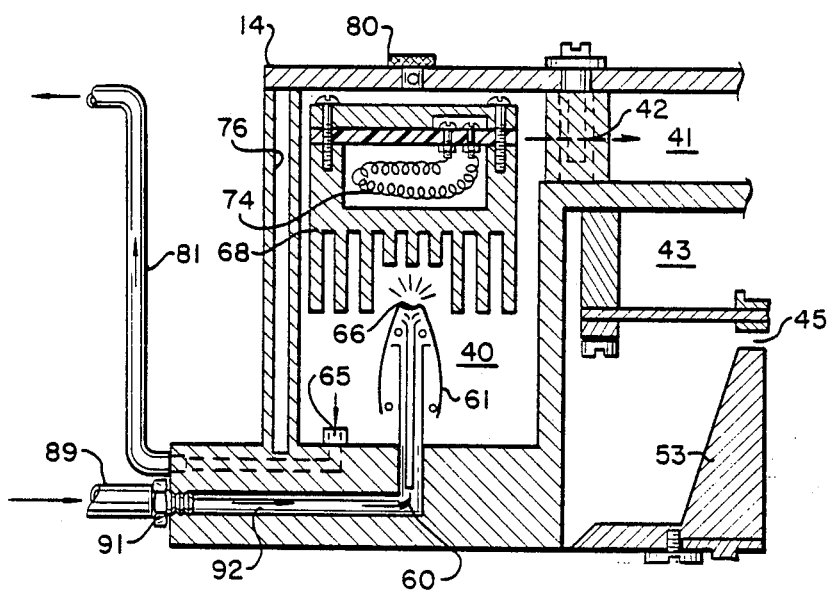
FIG. 6 is a side elevation view in cross-section of one of the heating elements in the fuel heating and vaporizing chamber in the embodiment of the system shown in FIG. 1.
Figure 7:
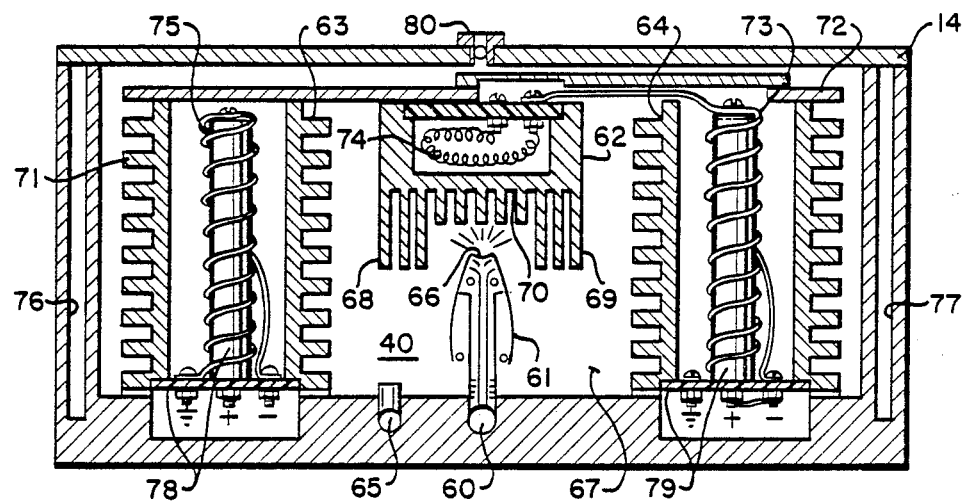
FIG. 7 is an end elevation view, in cross-section, of the heating elements and fuel atomizer in the fuel heating and vaporizing chamber of the carburetion system embodiment shown in FIG. 1.

Fuel heating chamber 40, shown in side elevational view in FIGS. 4, 6 and 7, and in plan view in FIG. 1 includes, as best seen in FIG. 7, fuel inlet 60, fuel atomizer 61, fuel heating elements 62, 63 and 64, and fuel outlet 65. Where the fuel is a liquid, such as gasoline, the fuel enters heating and vaporizing chamber 40 through fuel inlet 60, passes upwardly through fuel atomizer 61, and emerges as a spray from atomizer outlet 66. Fuel emerging from atomizer 66 impinges on surface 67 and projections 68, 69 and 70 of heating element 62, undergoes vaporization and heating, and is deflected outwardly toward the surfaces of heating elements 63 and 64. Each of these heating elements 63 and 64 has circumferential, fin-like projections, such as projections 71 and 72, which provide additional fuel-heating surfaces and means for dispersing the vaporized fuel further. Each of heating elements 62, 63 and 64 is heated internally, electrically, by radiant heat from heating coils 73, 74 and 75. In this embodiment, the three coils are joined together on a single circuit that can be linked, for example, to the 6-volt or 12-volt battery of an ordinary car or truck. Air spaces 76 and 77 act as insulators, preventing the escape of heat from chamber 40 by radiation.

Heating coils 73 and 75 are mounted on insulating cores 78 and 79, respectively. Air vent 80 admits outside air to chamber 40. This outside air propels or drives the heated, vaporized fuel through passageway 81, past the two power control valves 42 and into fuel-holding chamber 41. To effect this result, air vent 80 is positioned as far as possible from the inlet to passageway 81. Air vent 80 is preferably adjustable so that the flow rate of heated, vaporized fuel from heating chamber 40 to holding chamber 41 can be regulated and controlled at a predetermined desired level.

Figure 5:
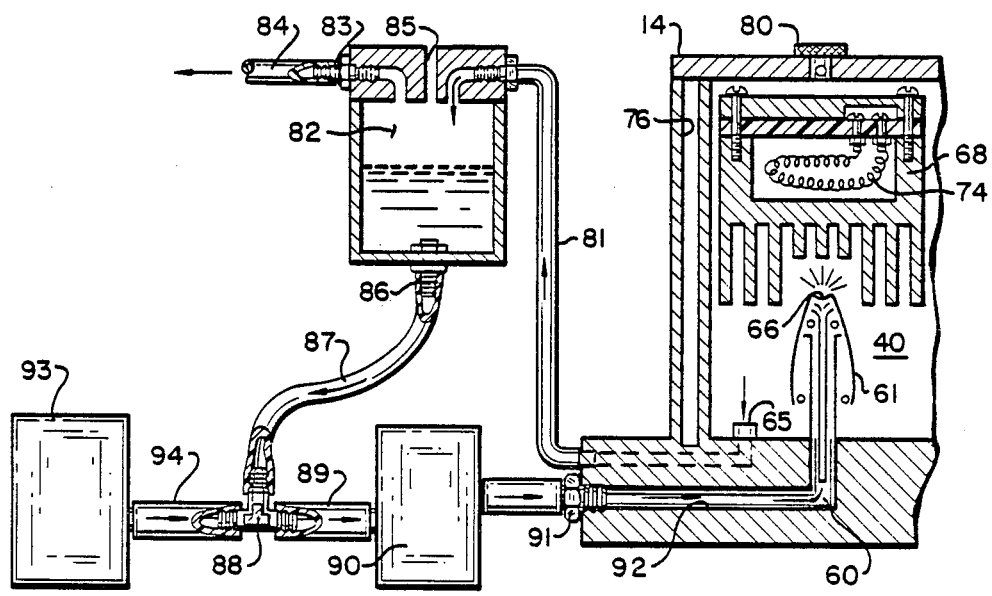
FIG. 5 is a side elevation view, in cross-section, of a preferred embodiment of the system for recycling unconsumed fuel from the heating and vaporizing chamber in the embodiment of the carburetion system shown in FIG. 1 and to the fuel delivery system joined thereto.

FIGS. 5 and 6 show a system for recycling unused fuel from chamber 40 to the fuel delivery system for the carburetion system of this invention. Fuel exits chamber 40 through outlet 65, and passes through line 81 to fuel-holding chamber 82 by means of vacuum imposed on chamber 82 through chamber outlet 83 and vacuum line 84. Air vent 85 for chamber 82 provides sufficient atmospheric pressure to drive fuel through the fuel-holding chamber outlet 86 and fuel line 87 to T-shaped joint 88. From T-shaped joint 88, the fuel flows through fuel line 89 to fuel pump 90. From fuel pump 90, fuel flows to outlet nozzle 91 and fuel line 92 to fuel inlet 60 for chamber 40. Other fuel enters the system from fuel tank 93 via line 94 and T-shaped joint 88.

In operation, fuel from fuel tank 93 passes, as shown in FIG. 5, into fuel atomizing/vaporizing chamber 40 through atomizer 61, which sprays droplets of fuel onto fuel vaporizing elements 68, 63 and 64. Small amounts of air admitted to chamber 40 through air vent 80 drive the atomized, vaporized fuel formed in chamber 40 through passageway 42 to fuel-holding chamber 41 at a regulated, desired level.

From fuel-holding chamber 41, the fuel passes through inlet 40 to vacuum chamber 43 and, from there, into admixture with outside air in chamber 46 (see FIG. 8) to form a combustible air/fuel mixture when diaphragm 49 moves upwardly against the resistance of diaphragm spring 109, as described at page 11, line 11, through page 12, line 5. The combustible air/fuel mixture formed in air/fuel mixing chamber 46 passes into the engine around stock choke 56, which provides thermal choking for starting the engine when cold.

What is claimed is:

1. A carburetion system comprising means for heating and vaporizing fuel for an internal combustion engine including a chamber having fuel inlet means linked to fuel-atomizing means and heating means for vaporizing atomized fuel by direct contact with the fuel; means for holding the heated vaporized fuel formed in said chamber; passage means linking said holding means to said chamber adjacent to said holding means; means for drawing heated vaporized fuel into admixture with air to form a combustible air/fuel mixture; and, atop said chamber, adjustable means for admitting air to said chamber and for driving heated, vaporized fuel mixed with air toward and into means for holding the heated, vaporized fuel adjacent to means for drawing the heated, vaporized fuel into admixture with air.

2. The system of claim 1 further comprising, within said chamber for heating and vaporizing fuel, means for feeding fuel to said heating and vaporizing means from a fuel supply system.

3. The system of claim 1 further comprising means for returning fuel from said chamber for heating and vaporizing fuel to the fuel supply means for said system comprising a fuel chamber means having air inlet means, means for forming a partial vacuum inside said fuel chamber means, fuel inlet means, fuel outlet means, fuel line means for passing fuel from said fuel heating and vaporizing means to said fuel chamber means through said fuel inlet means, and gravity-fed fuel line means for passing fuel from said fuel chamber means to said fuel supply system.

4. The system of claim 1 further comprising adjustable means for controlling the flow of heated, vaporized fuel from the heating and vaporizing chamber into said holding means.

5. The system of claim 1 wherein said means for drawing heated, vaporized fuel from said holding means includes vacuum-controlled, adjustable valve means in the outlet from said holding means, and further comprising an air/fuel mixing chamber; and vacuum chamber means having, as its inlet means, the outlet means from said holding means, and having, as its outlet means, means for passing heated, vaporized fuel from said vacuum chamber into an air/fuel mixing chamber, said vacuum chamber means further comprising diaphragm means joined to means for controlling the flow of outside air into said air/fuel mixing chamber.

* * * * *